April 5, 1938.  L. LEITZ ET AL  2,113,407
IMAGE ERECTING PRISM TELESCOPE FOR PHOTOGRAPHIC PURPOSES
Filed March 30, 1937   3 Sheets-Sheet 3

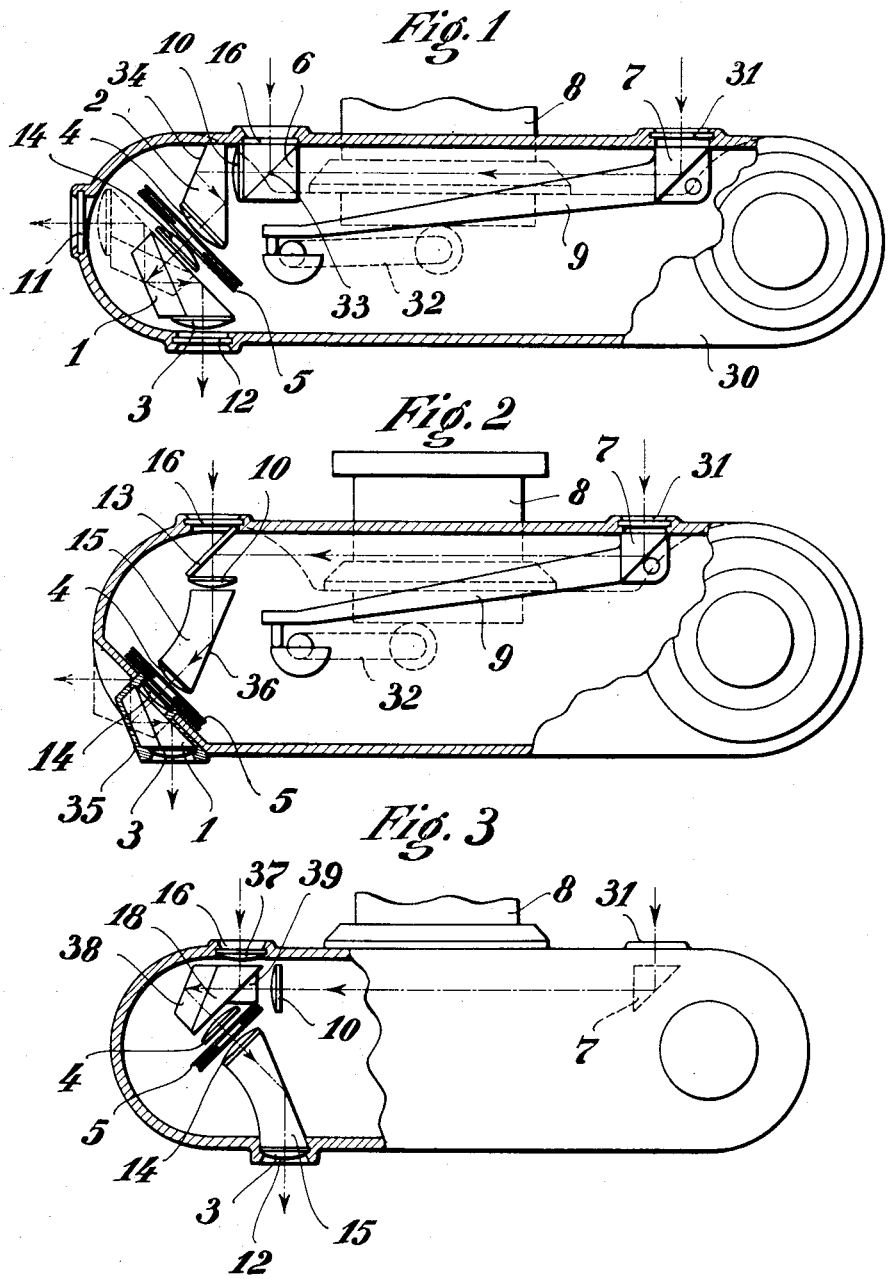

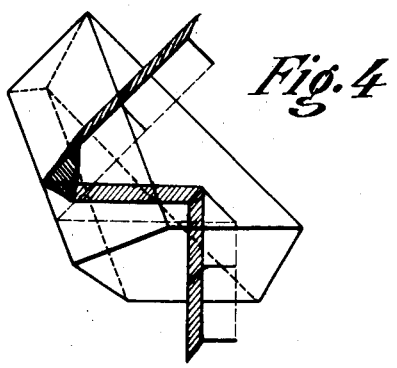
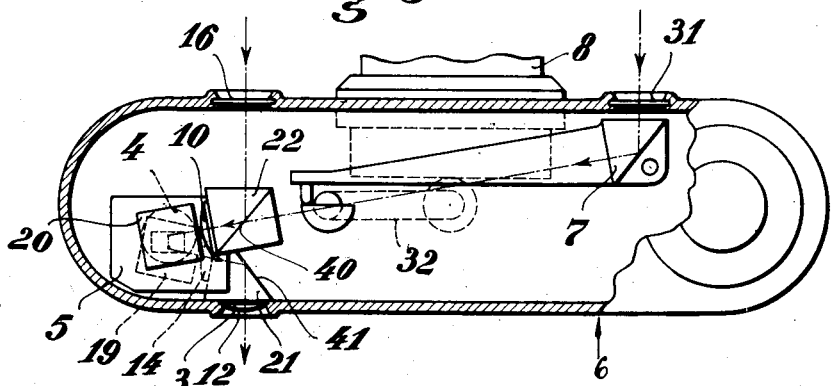
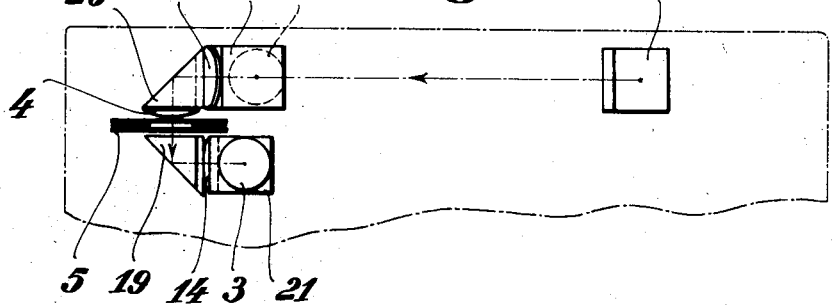

Heinrich Schneider
Ludwig Leitz
Max Engelmann
INVENTORS

BY

ATTORNEY

Patented Apr. 5, 1938

2,113,407

UNITED STATES PATENT OFFICE 2,113,407

IMAGE ERECTING PRISM TELESCOPE FOR PHOTOGRAPHIC PURPOSES

Ludwig Leitz, Max Engelmann, and Heinrich Schneider, Wetzlar, Germany, assignors to Ernst Leitz, G. m. b. H., Wetzlar, Germany Application March 30, 1937, Serial No. 133,760
In Germany March 24, 1936

3 Claims. (Cl. 95—44)

This invention relates to image erecting prism telescopes for photographic purposes in combination with range finders. Such view finders require two lens systems namely the objective system and the ocular system. The finder must also cover the same field of view as the camera objective. It has been found that if the entire field of view is included within an angle of forty eight degrees it is necessary to select lenses for the objective and the eye piece or ocular of such focal lengths and place them in such relative positions that the path of light between them becomes relatively long and is accompanied by a serious loss of light. The effective basis of the range finder is also disadvantageously restricted.

In order to make the device compact and practically usable in cameras in which size is a material consideration the lenses of the objective and the ocular cannot be large. On the other hand if the diameters of the lenses are decreased, their light collecting power is reduced. The light collecting power may be measured by the so called "*f*" value or relative aperture.

It happens therefore that an image erecting telescopic view finder for a camera in which the objective has an angle of view of forty eight degrees cannot be constructed practically with a relative aperture greater than 1:2.5, which however is not sufficient to afford a distinct viewing of the object under all light conditions. Furthermore, in order to obtain even such relative aperture of 1:2.5, a restriction is imposed in the selection of the basis of the range finder.

Accordingly this invention has for its object to provide an improved image erecting prism telescope view finder in combination with a range finder which includes certain novel features of construction and arrangement whereby the disadvantages referred to are eliminated and whereby certain advantages obtained as will appear hereinafter.

A prism telescope such as is used for view finders comprises an objective lens system, a set of prisms, a field stop or diaphragm in the plane where the objective forms the intermediate image of the object and an ocular lens system, generally arranged in the order named. In the embodiment of this invention the prism system is divided into two halves and the diaphragm placed between them and it is also placed between the objective and the field lens of the ocular. The embodiment also includes the use of glass for the prisms having a refractive index of at least 1.58.

Incidentally, the purpose of the prism system is not only to erect the image but, more importantly, to send the light rays back and forth between the various reflecting surfaces so as to render the entire structure more compact.

There are other novel features of invention which contribute to provide an improved view finder of the type described. The constructional features of the invention and the advantages which flow therefrom will however, be better understood from the following specification read in connection with the accompanying drawings in which Fig. 1 is a plan view of camera equipped with an image erecting prism telescope combined with a range finder, parts being in section and parts broken away.

Fig. 2 is a similar view showing a modification.

Fig. 3 shows a still further modification.

Fig. 4 is a perspective diagrammatic view of one of the prisms shown in the preceding figures.

Fig. 5 is a view similar to Figures 1–3 but shows a different arrangement of the prism systems.

Fig. 6 is a view looking in the direction of arrow 6 in Figure 5 and with all mechanical details omitted.

Figure 7:
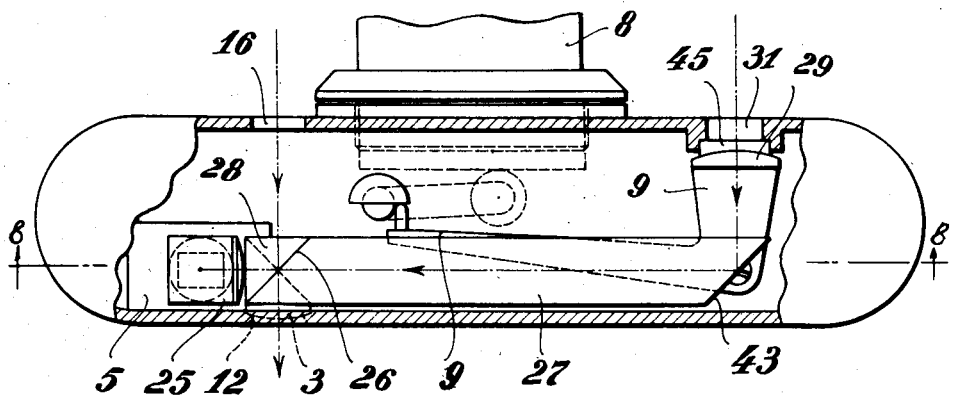
Fig. 7 is a view similar to the foregoing plan views but shows a different arrangement including a Porro prism system.

Fig. 1 illustrates the invention as applied to a hand camera 30 having an objective 8 and provided with two light admitting openings 31 and 16 closed as usual with a glass plate. Through the opening 31 the light for the range finder is admitted to the movable prism 7 which is actuated by means of levers 9 and 32, the latter being in operative engagement with the rear edge of the objective in a known manner. Through the other opening 16 light for the two finders is admitted to the glass body 6 which has a semi-transparent surface 33 for the range finder prism 7 as will be understood. The surface 33 serves also for the image erecting as required for the view finder. The objective lens is marked with the numeral 10. The light rays pass from the range finder prism 7 and from the glass body 6 through the lens 10 to the first main prism 2 which has two reflecting surfaces one of which is marked 34 and is silvered. The second lens of the finder objective lens system is marked 4 and is cemented to the prism 2.

The second prism of the finder system is marked 1 and is a roof edged prism with three reflecting surfaces as indicated diagrammatically in Figure 4. The ocular 3 in front of the eye opening 12 is cemented to the prism 1. Between the two prisms 1 and 2 there is placed a field stop 5. The second objective lens 4 is cemented to the prism 2 in front of the field stop 5. Behind the latter there is a field lens 14.

The paths of the light rays through the two finders are indicated by dotted lines with arrow heads. When the camera objective 8 is focused, the incoming light rays through the opening 31 are reflected by the movable prism 7 into the glass body 6 and there joined with the incoming light rays through the opening 16. The light rays then pass through the system and the images are seen by the operator looking through the eye opening 12.

The disclosed arrangement possesses several novel advantages. In the first place it is obvious that the invention provides a very compact concentrated system which requires very little space. Hence it is adapted for use in small cameras and may easily be put into already existing cameras to replace other view finders. Second, it will be noted that the field stop 5 is placed entirely free from the prism system and is between the finder objective and the field lens of the eye piece. Thus it is possible to provide for compensation of parallax in a known manner, such compensation not being a part of this invention and therefore not shown. An additional advantage is that the size of the area framed by the field stop may be made to correspond with the field covered by interchangeable camera objectives having different focal lengths. The means whereby such adjustment may be made is not shown. Then again, inasmuch as almost the entire path of the light is through glass of the relatively high refractive index of at least 1.58, the effective length of the range finder may be shortened without shortening the optical path of the light rays. It is known that if a certain optical path of light rays, having certain frequencies of light vibrations, in air is compared with another path of light rays having the same frequencies of light and is passed through glass, which has a higher refractive index, then the same number of light frequencies through the glass require a shorter effective length of the optical path. This of course results in a device which may be dimensioned to fit a small space. At the same time however, the actual optical path of the light is quite considerable so that the necessary magnifying power of the telescope may be obtained. Another feature of the system is that because a number, in this instance three, of the lenses are directly cemented to the glass prisms of high refractive index a comparatively high relative aperture of the lens system is provided for.

It will therefore be seen that because of the arrangement and features disclosed and referred to it is possible to arrange the various reflecting surfaces and optical elements of the view finder in such a manner that the path of light between objective and eye piece of the finder may be materially shortened and whereby the relative aperture of the lenses may be increased to 1:1 under the above named conditions. Not only has this increase the advantage of a considerable gain of light intensity, but at the same time the effective length of the basis of the range finder is fully retained. The construction also includes the feature that one of the reflecting surfaces of the range finder, namely the surface 33 in Figure 1, serves for the erection of the image, hence but very little space is needed for the erection of the image. The entire device is very compact and the alinement greatly facilitated.

Figure 1 illustrates another advantageous feature of the invention. By providing a third eye opening 11 at right angle to the eye opening 12 and by rotating the prism 1 into alinement with the opening 11 as shown in dotted lines the finder is converted into an angle view finder. The light rays from the opening 16 pass through the system as described and into the prism 1 where it is reflected as indicated to the eye opening 11. In other words the images through the openings 16 and 31 are joined as before and may be seen by looking into the eye opening 11.

Figure 2 illustrates a modification in which the ocular prism system of the view finder is contained in a housing 35 which is rotatably mounted in the wall of the camera as shown. In this modification the incoming light rays through the range finder opening 31 and the view finder opening 16 meet in the silvered transparent mirror 13, pass then through the finder objective 10 and into the prism 15 which has only one reflecting surface 36. The second lens 4 of the objective system is cemented to the prism 15. The rays pass through the diaphragm 5 and into the prism 1 through the field lens 14 as in Figure 1. By swinging the housing 35 into the position shown in dotted lines, the finder is converted into an angle finder as is obvious. In this case no additional eye opening is required such as at 11 in Fig. 1.

Figure 3 illustrates a modification in the lens arrangement shown in Figure 2. In Figure 3 the finder objective 10 is placed to one side of the opening 16 in alinement with the range finder prism 7 as shown. Another lens 37 is placed in the finder entrance opening 16. Behind the latter there is placed a prism 38 having three reflecting surfaces of which one 18 is silvered and corresponds to the silvered surfaces 33 and 13 in Figures 1 and 2. A small prism 39 is cemented to the prism 38 and serves for erecting the image. The light passes from the openings 31 and 16 into the prism 38 which has two reflecting surfaces, and thence into the prism 15 and the ocular 3 in the eye opening 12. The prism 15 has one reflecting surface.

Figures 5 and 6, the latter in diagram form, illustrate a finder system which will be understood best by tracing the paths of the light rays. In this system the image rays from the range finder prism 7 pass to a prism 22 which has a silvered surface 40 corresponding to the surface 33 in Figure 1 where the rays join the image rays from the finder opening 16. The rays then pass through the finder objective 10 which is cemented to prism 22 and thence into the prism 20. From the latter the rays are reflected through the field lens 4 and the diaphragm 5 into another similar prism 19 and a prism 21 in front of the eye opening 12 which contains the ocular 12. The two prisms 20 and 19 have their reflecting surfaces at an angle to each other and together with the prisms 21 and 22 they form a Porro prism system. It will be noted that the rays are directed towards the reflecting surface 41 in the prism 21 at an angle of about fifty degrees to the normal so that this prism provides total reflection also in cases where the angle of view is large.

Figure 8:
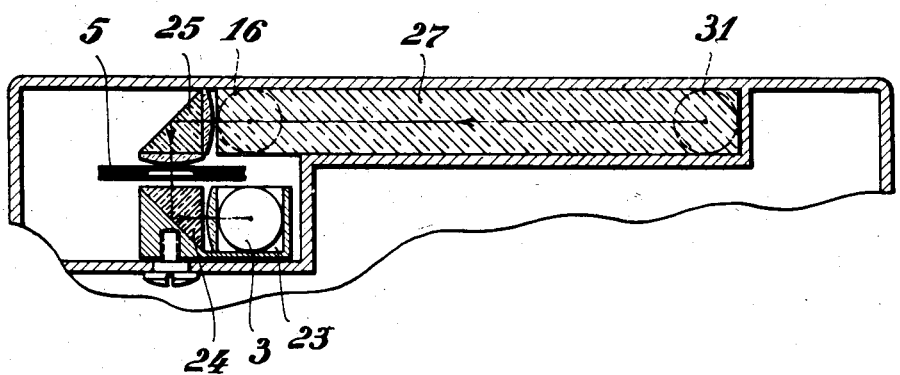
Fig. 8 is a sectional view taken on the line 8—8 of Fig. 7.

Figures 7 and 8 illustrate a finder system which utilizes ordinary Porro prisms such as the prisms 23, 24, and 25 in which the paths of the light rays are indicated by dotted lines and arrowheads. The range finder 27—28 has a glass body 26 which serves for erection of the image in the manner described above. The path of the image rays from the range finder opening 31 pass to the reflecting surface 43 thence to the body 26 and join the image rays from the finder opening 16. The rays then pass into prism 25, downward to prism 24 and thence into prism 23 in front of the ocular 3.

The opening 31 may be closed with a fixed lens 46 against which a lens 29 carried by the arm 9 is moved to provide the well known wedging effect in the path of the light rays.

It is believed that the foregoing description and the drawings fully disclose the invention and its advantages. It is obvious that minor further modifications may be arranged without departing from the principle of the invention and the scope of the appended claims.

We claim:—

1. In combination, a photographic camera including an image erecting prism telescope view finder and a basis range finder in operative relations, openings in said camera for admitting light to the said finders, an eye opening common to both finders, said view finder including an objective lens system and an ocular lens system interposed between one of the said light admitting openings and the eye opening, an image erecting prism in each of the said two lens systems, a field stop diaphragm supported intermediate the two lens systems, a second eye opening in said camera at right angle to the said first eye opening, the said ocular lens system being movable out of optical alinement with the first eye opening and into optical alinement with the second eye opening to convert the said view finder into an angle view finder.

2. In combination, a photographic camera including an image erecting prism telescope view finder and a basis range finder in operative relations, openings in said camera for admitting light to the said finders, said view finder including an objective lens system and an ocular lens system, an image erecting prism in each of the said two lens systems, a field stop diaphragm between the two lens systems, a housing enclosing the said ocular lens system and having an eye opening for both of said finders, said housing being rotatable 180° about the optical axis through the field stop diaphragm whereby to convert the said view finder into an angle view finder.

3. In a photographic camera having front and rear walls closely adjacent to each other and an image erecting prism telescopic view finder in combination with a basis range finder between said walls including light openings in the front wall of the camera for admitting light to the said finders, an eye opening common to both finders in the rear wall of the camera, said view finder comprising an objective lens system including two lenses, an image erecting prism between the lenses in said system, an ocular lens system including two lenses with an image erecting prism between the same, a field stop between the said lens systems and an optical body behind the view finder light admitting opening for combining the light rays through the said light admitting openings and directing them into the said view finder objective lens system whereby to provide a relatively long path of light between the light admitting opening to said view finder and the eye opening thereof.

LUDWIG LEITZ.
MAX ENGELMANN.
HEINRICH SCHNEIDER.